(12) United States Patent
Cai et al.

(10) Patent No.: US 8,711,571 B2
(45) Date of Patent: Apr. 29, 2014

(54) PORTABLE MULTIMEDIA PLAYER

(75) Inventors: Huabo Cai, Shenzhen (CN); Keshun Lin, Shenzhen (CN); Min Qin, Shenzhen (CN)

(73) Assignee: Shenzhen Netcom Electronics Co., Ltd., Guangdong (CN)

( * ) Notice: Subject to any disclaimer, the term of this patent is extended or adjusted under 35 U.S.C. 154(b) by 317 days.

(21) Appl. No.: 13/320,883

(22) PCT Filed: Aug. 17, 2010

(86) PCT No.: PCT/CN2010/076040
§ 371 (c)(1),
(2), (4) Date: Nov. 16, 2011

(87) PCT Pub. No.: WO2011/124054
PCT Pub. Date: Oct. 13, 2011

(65) Prior Publication Data
US 2012/0069535 A1     Mar. 22, 2012

(30) Foreign Application Priority Data

Apr. 9, 2010 (CN) .................. 2010 2 0159451 U
Jul. 19, 2010 (CN) .................. 2010 2 0263275 U

(51) Int. Cl.
*H05K 5/00* (2006.01)
(52) U.S. Cl.
USPC .............. 361/752; 361/679.1; 361/679.41; 361/719; 361/760; 361/790; 320/103; 323/282; 600/485; 345/55; 345/156; 345/505; 348/14.1; 348/143; 348/207.1; 348/211.99; 348/374; 348/441; 348/554; 379/93.17; 439/638; 455/556.1; 463/33; 725/47; 725/53; 725/123; 725/133; 710/13; 710/73; 710/304
(58) Field of Classification Search
USPC .............. 361/752, 679.01, 679.41, 719, 760, 361/790; 320/103; 323/282; 340/173, 418, 340/654; 345/55, 156, 505; 348/14.1, 143, 348/207.1, 211.99, 374, 441, 554; 379/93.17; 439/638; 455/556.1; 463/33; 600/485; 707/770, 822; 710/13, 73, 304; 713/300; 715/784; 718/100; 725/38.9, 47, 53, 123, 133; 726/5, 7, 19
See application file for complete search history.

(56) References Cited

U.S. PATENT DOCUMENTS

| | | | |
|---|---|---|---|
| 6,932,640 B1 * | 8/2005 | Sung ............................. | 439/405 |
| 7,318,750 B1 * | 1/2008 | Chacon et al. ................ | 439/638 |
| 7,413,467 B1 * | 8/2008 | Lai et al. ....................... | 439/489 |
| 7,728,223 B2 * | 6/2010 | Shintani ......................... | 174/33 |
| 7,862,368 B1 * | 1/2011 | Lai et al. ....................... | 439/358 |
| 8,021,193 B1 * | 9/2011 | Jatou et al. .................... | 439/638 |
| 8,360,804 B1 * | 1/2013 | Meister ......................... | 439/564 |
| 8,407,768 B1 * | 3/2013 | Hayter .............................. | 726/5 |
| 8,407,773 B1 * | 3/2013 | Hayter et al. ..................... | 726/7 |

(Continued)

*Primary Examiner* — Xiaoliang Chen
(74) *Attorney, Agent, or Firm* — Shimokaji & Associates P.C.

(57) ABSTRACT

The present disclosure relates to the field of players, and provides a portable multimedia player includes a housing; an integrated circuit module received in the housing for playing multimedia; a storage device interface electrically connected to the integrated circuit module, and configured to connect to an external storage device; and a male HDMI connector electrically connected to the integrated circuit module, configured to be connected to a female HDMI of an external display device. The multimedia function of the external display device is expanded by connecting the male HDMI 11 to the female HDMI of the external display device. The portable multimedia player is connected to the display device without any corresponding interface cable, such that it affords convenient using to users and beautiful appearance.

8 Claims, 4 Drawing Sheets

(56) References Cited

U.S. PATENT DOCUMENTS

| | | | |
|---|---|---|---|
| 2002/0178558 A1* | 12/2002 | Doshi et al. | 24/660 |
| 2006/0095331 A1* | 5/2006 | O'Malley et al. | 705/22 |
| 2006/0227963 A1* | 10/2006 | Bernard et al. | 379/388.01 |
| 2006/0258216 A1* | 11/2006 | Konda | 439/607 |
| 2007/0094699 A1* | 4/2007 | Chen | 725/133 |
| 2007/0250872 A1* | 10/2007 | Dua | 725/81 |
| 2007/0282208 A1* | 12/2007 | Jacobs et al. | 600/485 |
| 2008/0002355 A1* | 1/2008 | Carnevali | 361/686 |
| 2008/0170130 A1* | 7/2008 | Ollila et al. | 348/211.99 |
| 2008/0174595 A1* | 7/2008 | Jatou et al. | 345/418 |
| 2008/0180567 A1* | 7/2008 | Mito et al. | 348/373 |
| 2008/0186664 A1* | 8/2008 | Chang et al. | 361/681 |
| 2008/0307456 A1* | 12/2008 | Beetcher et al. | 725/38 |
| 2008/0307462 A1* | 12/2008 | Beetcher et al. | 725/53 |
| 2008/0307463 A1* | 12/2008 | Beetcher et al. | 725/53 |
| 2008/0318625 A1* | 12/2008 | Rofougaran | 455/556.1 |
| 2008/0318675 A1* | 12/2008 | Rofougaran et al. | 463/33 |
| 2009/0021797 A1* | 1/2009 | Luciano | 358/474 |
| 2009/0031387 A1* | 1/2009 | Boyden et al. | 725/132 |
| 2009/0077607 A1* | 3/2009 | Doumuki | 725/123 |
| 2009/0091902 A1* | 4/2009 | Kim | 361/760 |
| 2009/0092236 A1* | 4/2009 | Wilson | 379/93.17 |
| 2009/0109294 A1* | 4/2009 | Cummings et al. | 348/207.1 |
| 2009/0109329 A1* | 4/2009 | Cummings et al. | 348/374 |
| 2009/0119013 A1* | 5/2009 | O'Malley | 701/211 |
| 2009/0125968 A1* | 5/2009 | Perlman et al. | 725/133 |
| 2009/0150938 A1* | 6/2009 | Clancy | 725/47 |
| 2009/0153467 A1* | 6/2009 | Crovella | 345/156 |
| 2009/0156054 A1* | 6/2009 | Wang | 439/527 |
| 2009/0225863 A1* | 9/2009 | Perlman et al. | 375/240.24 |
| 2009/0251526 A1* | 10/2009 | Book | 348/14.01 |
| 2009/0262190 A1* | 10/2009 | Dotchevski et al. | 348/143 |
| 2009/0328086 A1* | 12/2009 | Yanagimoto | 725/9 |
| 2010/0007668 A1* | 1/2010 | Casparian et al. | 345/505 |
| 2010/0013742 A1* | 1/2010 | Unger | 345/55 |
| 2010/0026912 A1* | 2/2010 | Ho | 348/836 |
| 2010/0060784 A1* | 3/2010 | Ansari | 348/441 |
| 2010/0062653 A1* | 3/2010 | Mao et al. | 439/660 |
| 2010/0073560 A1* | 3/2010 | Kitano et al. | 348/554 |
| 2010/0097768 A1* | 4/2010 | Ishii et al. | 361/719 |
| 2010/0118327 A1* | 5/2010 | Caspar et al. | 358/1.13 |
| 2010/0167816 A1* | 7/2010 | Perlman et al. | 463/30 |
| 2010/0175022 A1* | 7/2010 | Diehl et al. | 715/784 |
| 2010/0195303 A1* | 8/2010 | Ishikawa | 361/790 |
| 2010/0211709 A1* | 8/2010 | Chen et al. | 710/73 |
| 2010/0231397 A1* | 9/2010 | Ke | 340/654 |
| 2010/0244765 A1* | 9/2010 | Collopy et al. | 320/103 |
| 2010/0250789 A1* | 9/2010 | Collopy et al. | 710/13 |
| 2010/0250817 A1* | 9/2010 | Collopy et al. | 710/304 |
| 2010/0250818 A1* | 9/2010 | Gill et al. | 710/304 |
| 2010/0250975 A1* | 9/2010 | Gill et al. | 713/300 |
| 2010/0251243 A1* | 9/2010 | Gill et al. | 718/100 |
| 2010/0251361 A1* | 9/2010 | Collopy et al. | 726/19 |
| 2010/0267276 A1* | 10/2010 | Wu et al. | 439/502 |
| 2010/0332569 A1* | 12/2010 | Bryant-Rich et al. | 707/912 |
| 2011/0037447 A1* | 2/2011 | Mair | 323/282 |
| 2011/0218864 A1* | 9/2011 | Pentz et al. | 705/14.71 |
| 2011/0242002 A1* | 10/2011 | Kaplan et al. | 345/173 |
| 2011/0246928 A1* | 10/2011 | Braunstein et al. | 715/775 |

\* cited by examiner

PORTABLE MULTIMEDIA PLAYER

BACKGROUND OF THE INVENTION

1. Field of the Invention

The present disclosure relates to players, and particularly, to a portable multimedia player.

2. Description of the Related Art

Nowadays, a conventional multimedia player includes a female High Definition Multimedia Interface (HDMI) connector disposed thereof, and it employs a corresponding interface adapter cable, such as a HDMI cable, to connect a display device, such as a flat panel display, to display video files downloaded from the network. However, it is inconvenient. Furthermore, since a plurality of adapter cables tangles easily, the whole appearance of the player is affected.

In summary, the conventional multimedia player needs a corresponding interface adapter cable to connect to the display device, it is inconvenient for the users, and the appearance is affected.

SUMMARY OF THE INVENTION

It is an objective of the present disclosure to provide a portable multimedia player, which can overcome the deficiencies of the prior art that the conventional multimedia player needs a corresponding interface adapter cable to connect the display device, which is inconvenient for the users, and the appearance is affected.

Compares to the prior art, the multimedia function of the external display device is expanded directly by connecting the male HDMI connector, which is connected to the integrated circuit module, to a female HDMI connector of the external display device. Since the portable multimedia player is able to connect the display device without any adapter cables, it is convenient and pleasing for users.

BRIEF DESCRIPTION OF THE DRAWINGS

The skilled artisan will understand that the drawings, described below, are for illustration purposes only. The drawings are not intended to limit the scope of the present teachings in any way. Like reference numerals designate corresponding parts throughout the several views.

DETAILED DESCRIPTION OF THE EMBODIMENTS

Further objects, features and advantages of the present invention will become apparent from detailed descriptions in reference to the drawings and embodiments. It should be pointed out that the disclosure is illustrated by way of illustrated embodiments and not by way of limitation in the illustrated embodiments.

In some embodiments of the present disclosure, the multimedia function of an external display device is expanded directly by connecting the male HDMI connector, which is connected to the integrated circuit module, to a female HDMI connector of the external display device. Since the portable multimedia player is able to connect the display device without any adapter cables, it is convenient and pleasing for users.

In other embodiments of the present disclosure, the function of a remote control is implemented by a remote control cover board. When the remote control cover board is not in use, a cap which is positioned at an end of the remote control cover board is latched with the male HDMI connector, such that it prevents the remote control cover board from detaching from a housing when the remote control cover board is not in use. Therefore, it will facilitate the user to find one of the housing having the integrated circuit module and the remote control cover board being capable of remote controlling.

Detailed description of the present disclosure will be made in terms of specific embodiments as following.

Embodiment 1

Figure 1:
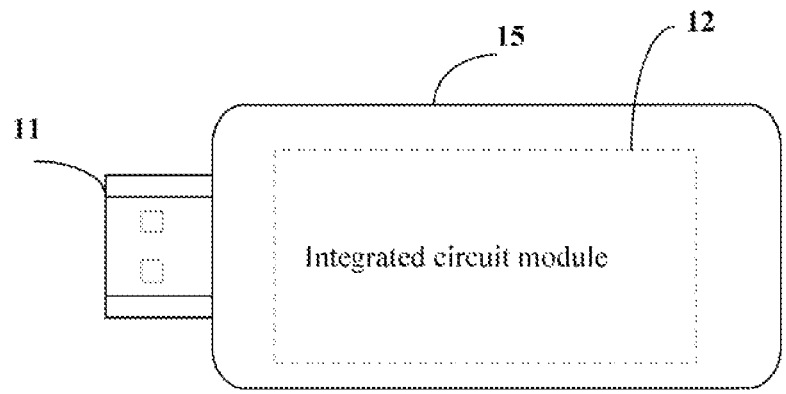
FIG. 1 is a schematic, front view of a first embodiment of a portable multimedia player.

Referring to FIG. 1, a first embodiment of a portable multimedia player includes:

a housing 15;

an integrated circuit module 12 received in the housing 15 for playing multimedia;

a storage device interface electrically connected to the integrated circuit module 12 and configured to connect to an external storage device; and a male HDMI connector 11 electrically connected to the integrated circuit module 12 and configured to be connected to a female HDMI connector of an external display device.

In the illustrated embodiment, the storage device interface is configured to connect to the external storage device to expand a storage capacity of the portable multimedia player.

The storage device interface may be a Universal Serial bus (USB) interface or a Secure Digital Input Output (SDIO) interface. It should be pointed out that the storage device interface may be other type of interface.

In the illustrated embodiment, the storage device interface is disposed on the housing 15 and is electrically connected to the integrated circuit module 12 for connecting to the external storage device.

The male HDMI connector 11 is disposed on the housing 15, electrically connected to the integrated circuit module 12, and configured to be connected to a female HDMI connector of the external display device.

In the embodiment of the present disclosure, the multimedia function of the external display device is expanded directly by connecting the male HDMI connector, which is connected to the integrated circuit module, to a female HDMI connector of the external display device. Since the portable multimedia player is able to connect the display device without any adapter cables, it is convenient and pleasing for users.

Embodiment 2

Figure 2:
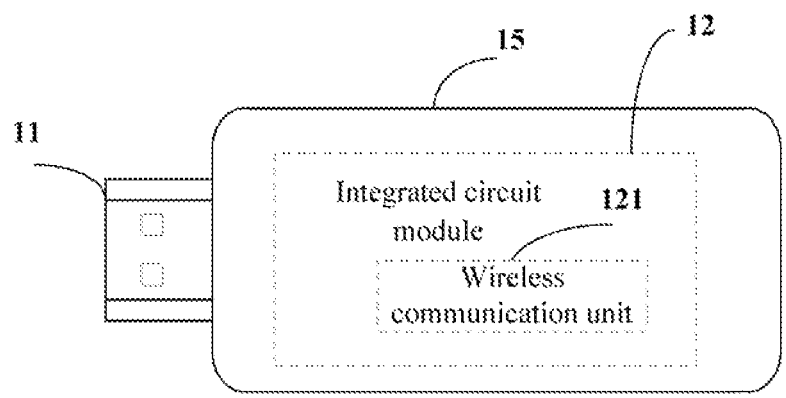
FIG. 2 is a schematic, front view of a second embodiment of a portable multimedia player.

Referring to FIG. 2, a second embodiment of a portable multimedia player is similar to that of the first embodiment, except that the integrated circuit module 12 includes a wireless communication unit 121, and the portable multimedia player further includes a wireless remote control which is connected to the wireless communication unit 121 and is configured to remote control the integrated circuit module 12.

In the illustrated embodiment, the wireless communication unit 121 is preferred to be a 2.4G wireless communication unit 121 or a 5.8G wireless communication unit 121.

It is convenient for users to do appropriate operations by remote controlling the integrated circuit module 12 via the wireless remote control.

In use, the portable multimedia player may be placed to a side portion or a back portion of a display device, and be remote controlled by the wireless remote control, therefore the appearance of the front side of the display device is not affected.

In addition, the wireless communication unit 121 may be other type of wireless communication unit 121, such as WiFi or WCDMA. It can login a server wirelessly, download multimedia files online and play the multimedia files by the external display device. It is capable of playing multimedia files without connecting to the external storage device, thus it is convenient.

Embodiment 3

Figure 3:
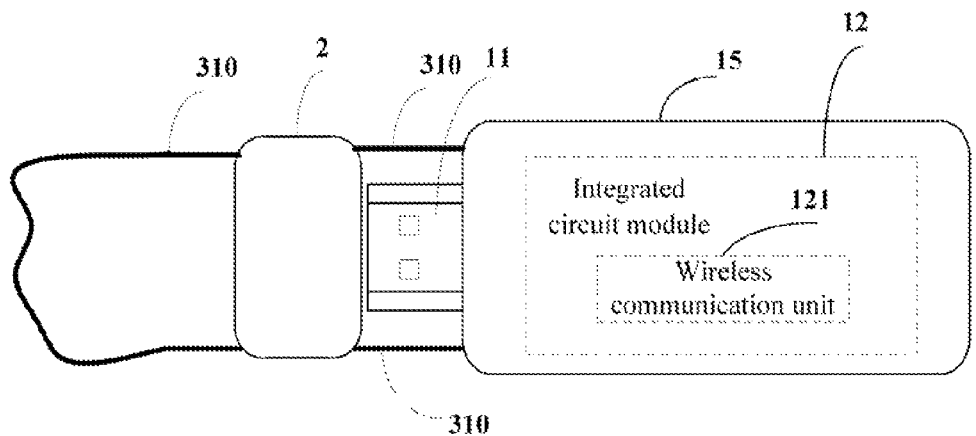
FIG. 3 is a schematic, front view of a third embodiment of a portable multimedia player.

Referring to FIG. 3, a third embodiment a portable multimedia player is similar to that of the second embodiment, except that the portable multimedia player further includes a lid 2 covering the male HDMI connector 11.

Dirt can be prevented from entering the male HDMI connector 11 by latching the lid 2. Furthermore, abrasion of the male HDMI connector 11 may also be prevented in case of colliding with other objects, such that use life of the male HDMI connector 11 is prolonged. In other embodiments, the male HDMI connector 11 is telescopically received in the housing 15, such that it can save space and protect the portable multimedia player.

In the illustrated embodiment, the lid 2 and the housing 15 define two holes, respectively; the portable multimedia player further includes flexible ropes passing through the holes and interconnecting the lid 2 and the housing 15. The lid 2 is capable of moving along the flexible ropes 310.

The lid 2 is prevented from being lost by using the flexible ropes 310, and it is convenient to connect the portable multimedia player to or detach the portable multimedia player from the external display device.

In the embodiment of the present disclosure, the portable multimedia player further includes function buttons disposed on the housing 15 and electrically connected to the integrated circuit module 12, to choose multimedia programs and volume. The integrated circuit module 12 is implemented corresponding functions via the function buttons. In the embodiment of the present disclosure, the shapes and positions relative to the housing 15 of the function buttons may be adjusted in need.

The multimedia function of the external display device is expanded directly by the male HDMI connector 11 which is connected to the integrated circuit module 12 and is configured to be connected to a female HDMI connector of the external display device. The portable multimedia player is connected to the display device without any corresponding interface cable, it is convenient and pleasing for users.

Embodiment 4

Figure 4:
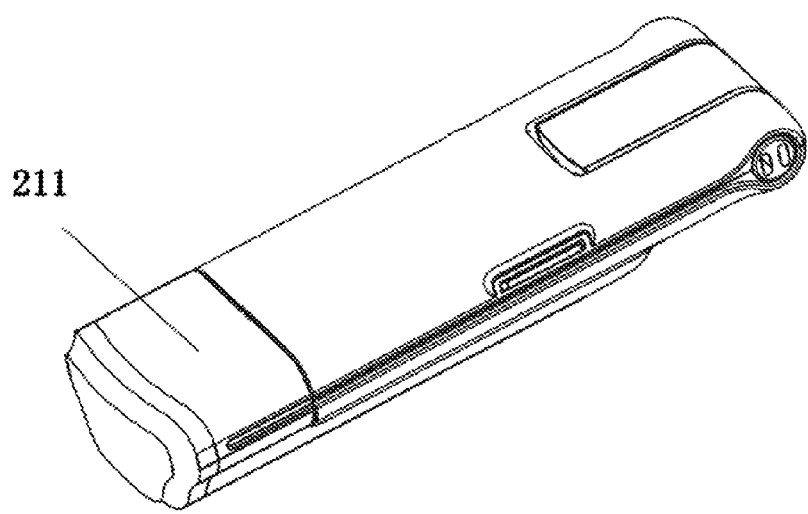
FIG. 4 is a schematic, perspective view of a fourth and a fifth embodiments of a portable multimedia player.
Figure 5:
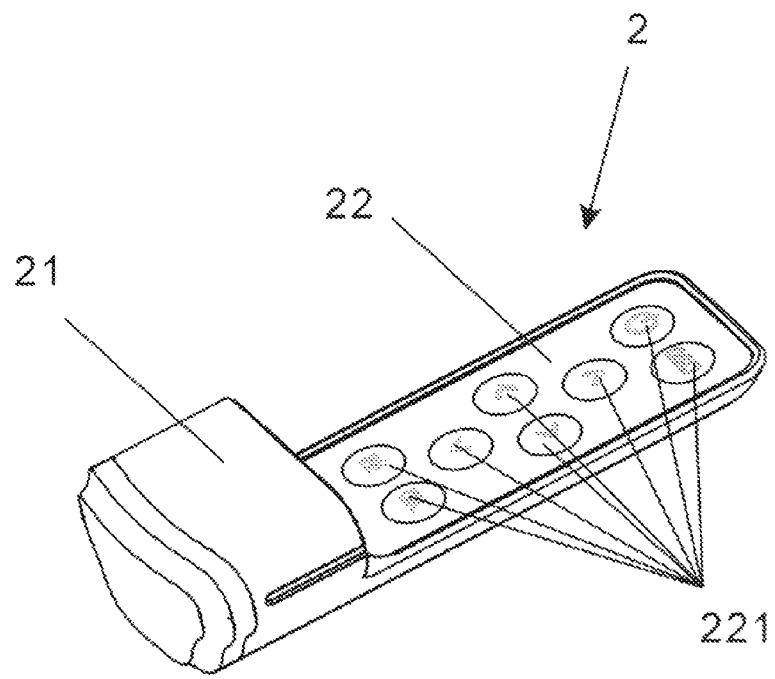
FIG. 5 is a schematic, perspective view of a lid of the fourth and the fifth embodiments of the portable multimedia player.
Figure 6:
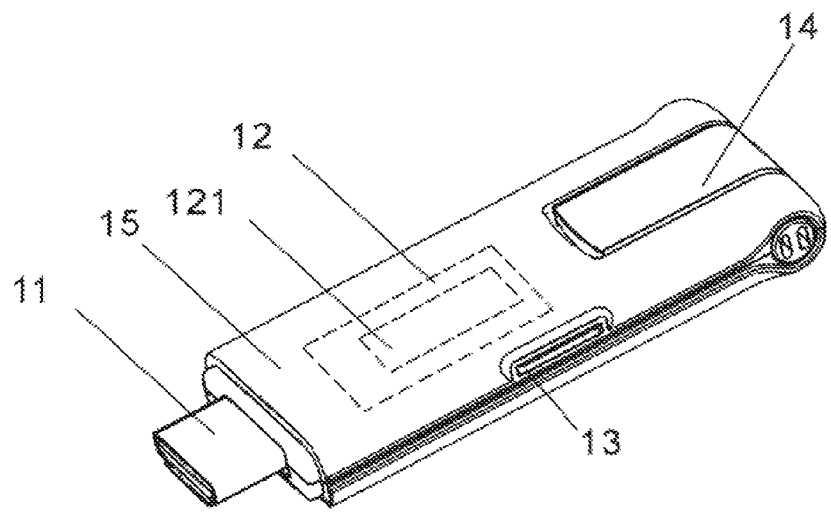
FIG. 6 is a schematic, perspective view of a housing of the fourth and the fifth embodiments of the portable multimedia player.

Referring to FIGS. 4 through 6, an embodiment of a portable multimedia player is similar to that of the second embodiment, except that the portable multimedia player further includes a lid 2 covering the male HDMI connector 11.

The lid 2 includes a remote control cover hoard 22 wirelessly connected to the wireless communication unit 121 and configured to remote control the integrated circuit module 12, and a cap 21 positioned at an end of the remote control cover board 22 and latched with the male HDMI connector 11.

The remote control cover board 22 includes a remote control circuit received therein. The lid 2 further includes remote control buttons 221 disposed on the remote control cover board 22 and electrically connected to the remote control circuit.

In use, when users use the remote control cover board 22, the lid 2 is removed, and the function of remote control is implemented by operating the remote control cover board 22. After use, it is convenient to latch the lid 2 with the male HDMI connector 11.

In other embodiments, the integrated circuit module 12 includes a wireless communication unit 121 configured to communicate with the remote control cover board 22 wirelessly.

The cap 21 of the lid 2 is latched with the male HDMI connector 11.

In the illustrated embodiment, the wireless communication unit 121 is a 2.4G wireless communication unit 121 or a 5.8G wireless communication unit 121.

It should be pointed out that the shapes of the integrated circuit module 12 and the wireless communication unit shown in the drawings are not to limit the present disclosure, the drawings are schematic, and the shapes and sizes may be changed according to the need in specific application.

In use, corresponding operation is made by remote controlling the integrated circuit module 12 via the remote control cover board 22.

In use, the portable multimedia player of the present disclosure may be connected to a side portion or a back portion of the display device, and remote controlled by the wireless remote control; therefore the portable multimedia player doesn't affect the whole appearance of display device.

The storage device interface is disposed on the housing 15 and electrically connected to the integrated circuit module 12 to connect to the external storage device and expand a storage capacity of the portable multimedia player. The storage device interface may be a Universal Serial bus (USB) interface 14 and/or Secure Digital Input Output (SDIO) interface 13. Of course, it may he other type of interface alternatively.

In the embodiment of the present disclosure, the storage device interface includes a Secure Digital Input Output (SDIO) interface 13 to be connected to a SDIO storage device and a Universal Serial bus (USB) interface 14 to be connected to a USB storage device. The USB interface 14 is capable of rotating about 180 degrees. In use, the portable multimedia player of the present disclosure may include only one of the Universal Serial bus (USB) interface 14 or only one of the Secure Digital Input Output (SDIO) interface 13, and the present disclosure is not to be limited thereto.

The male HDMI connector 11 is disposed on the housing 15, electrically connected to the integrated circuit module 12, and configured to be connected to a female HDMI connector of the external display device.

In the embodiments of the present disclosure, the multimedia function of the external display device is expanded by connecting the male HDMI connector 11 to the female HDMI connector of the external display device. The portable multimedia player is connected to the display device without any corresponding interface cable, such that it affords convenient using to users and beautiful appearance.

Embodiment 5

Figure 7:
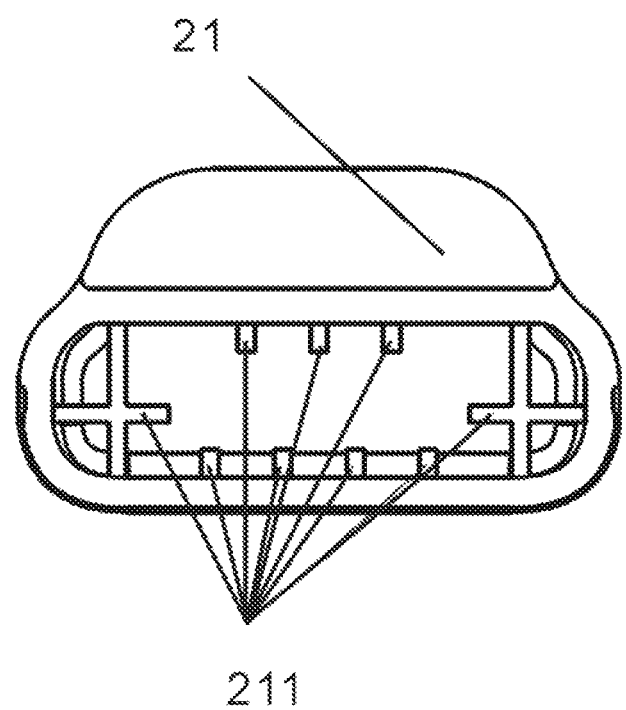
FIG. 7 is a schematic view of a cap of a lid of a sixth embodiment.

Referring to FIG. 7, an embodiment of a portable multimedia player further includes a protrusion portion 211 formed on the cap 21 to fix the male HDMI connector 11.

In the illustrated embodiment, the protrusion portion 211 is configured to fix the male HDMI connector 11.

In the illustrated embodiments of the present disclosure, the cap 21 is fixed to the male HDMI connector 11 by the protrusion portion 211, therefore, the cap 21 is prevented from detaching from the male HDMI connector 11.

While certain embodiments have been shown and described, various modifications and substitutions may be made thereto without departing from the spirit and scope of the invention. Therefore, it is to be understood that the present disclosure has been described by way of illustration and not limitations.

What is claimed is:

1. A portable multimedia player, comprising:
   a housing;
   an integrated circuit module received in the housing for playing multimedia, wherein the integrated circuit module comprises a wireless communication unit;
   a storage device interface electrically connected to the integrated circuit module, configured to connect to an external storage device; and
   a male HDMI connector electrically connected to the integrated circuit module, wherein the male HDMI connector is configured to be connected to a female HDMI connector of an external display device;
   a lid covering the male HDMI connector, wherein the lid comprises:
      a remote control cover board wirelessly connected to the wireless communication unit and configured to remote control the integrated circuit module, the remote control cover board comprises a remote control circuit disposed therein,
      a cap positioned at an end of the remote control cover board and latched with the male HDMI connector, and
      remote control buttons electrically connected to the remote control circuit and disposed on the remote control cover board.

2. The portable multimedia player of claim 1, wherein the wireless communication unit is a 2.4G wireless communication unit or a 5.8G wireless communication unit.

3. The portable multimedia player of claim 1, further comprising a wireless remote control connected to the wireless communication unit and configured to remote control the integrated circuit module.

4. The portable multimedia player of claim 1, wherein the wireless communication unit is configured to login a server wirelessly and download multimedia files online.

5. The portable multimedia player of claim 1, wherein the storage device interface comprises a Universal Serial bus interface or/and a Secure Digital Input Output interface.

6. The portaHible multimedia player of claim 5, wherein the Universal Serial bus interface is capable of rotating about 180 degrees.

7. The portable multimedia player of claim 1, wherein the cap forms a protrusion portion configured to fix the male HDMI connector.

8. The portable multimedia player of claim 1, further comprising function buttons disposed on the housing, the function buttons are electrically connected to integrated circuit module and are configured to control the integrated circuit module.

* * * * *